V. S. BARBER.
Harvester.
No. 106,535.
2 Sheets—Sheet 1.
Patented Aug. 23, 1870.
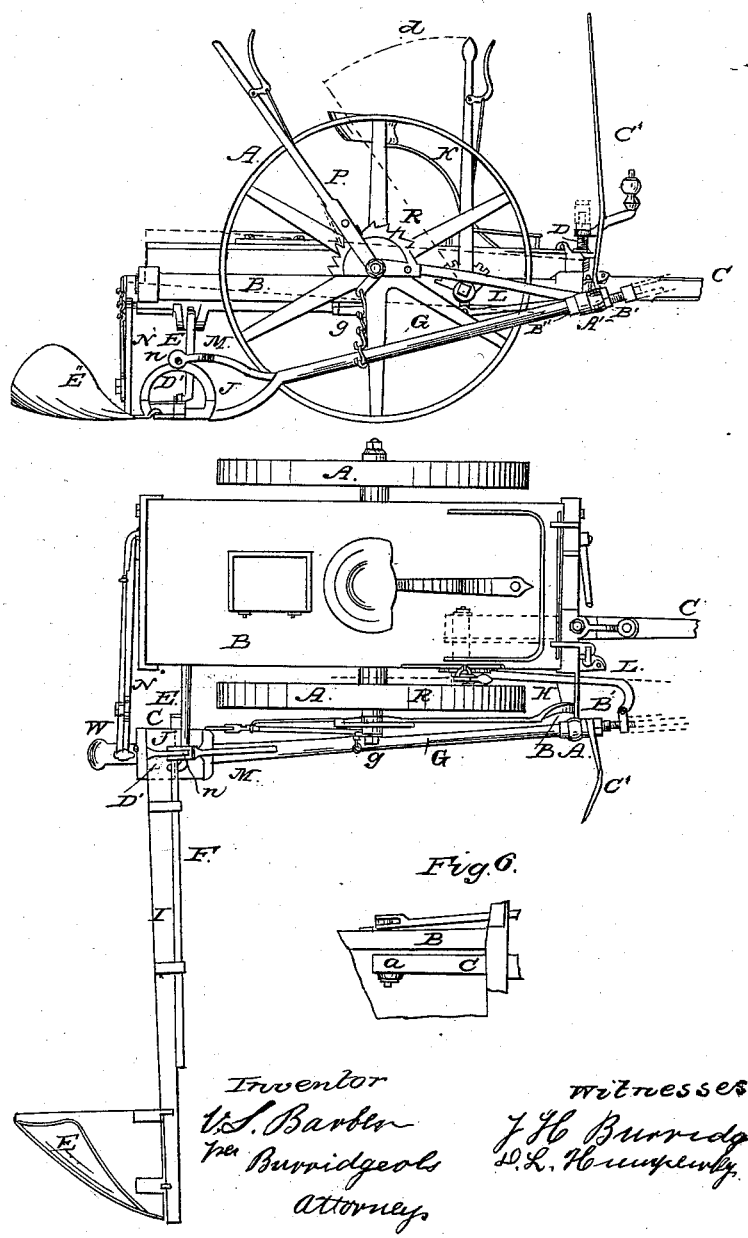

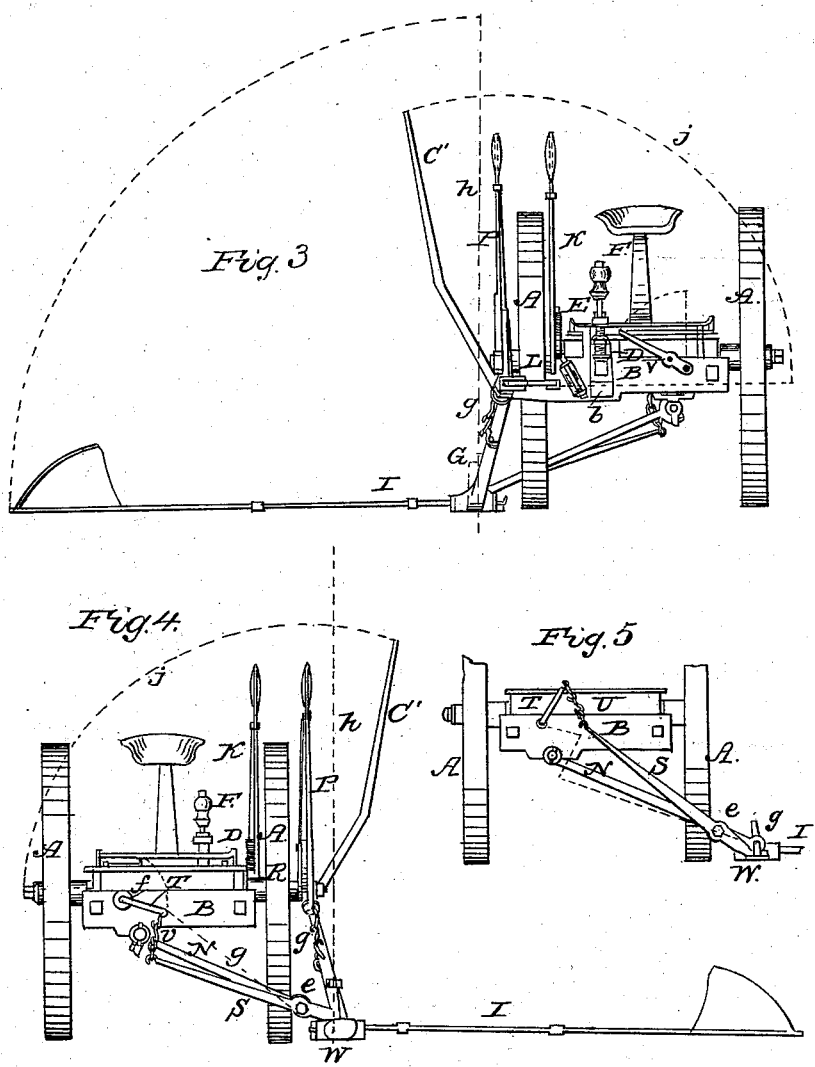

UNITED STATES PATENT OFFICE.

VINCENT S. BARBER, OF ALLIANCE, OHIO, ASSIGNOR TO NIXON & CO., OF SAME PLACE.

IMPROVEMENT IN HARVESTERS.

Specification forming part of Letters Patent No. 106,535, dated August 23, 1870.

Be it known that I, VINCENT S. BARBER, of Alliance, in the county of Stark and State of Ohio, have invented certain new and useful Improvements in Mowing-Machines, of which the following is a description:

Figure 1 is a side view of the machine; Fig. 2, a view of the top; Fig. 3, a front view; Fig. 4, a view of the rear end. Figs. 5 and 6 are detached sections.

Like letters of reference refer to like parts in the different views.

In Fig. 2, A A represent a pair of driving-wheels, on which is mounted the frame and box B, in which is arranged, or may be, the driving-gear of the machine. To the frame B, referred to, is pivoted the pole C, at the point a, Fig. 6, and is secured to the front thereof in a slot, b, in which the pole slides, thereby elevating or lowering the rear end of the frame by means of the screw D, Figs. 3 and 4. Said screw works in a nut, E, attached to the frame, whereas the lower end of the screw terminates in a collar secured in the pole, so that it may turn on being operated by the handle F.

The purpose of thus elevating and lowering the frame will presently be shown.

G, Figs. 1 and 2, is the drag-bar, and consists of a tube, the front end of which is connected to an arm, H, Fig. 2, projecting from the side of the frame. To the lower end of said bar is connected the finger-bar I by means of a shoe or stay, J, Figs. 1 and 2, pivoted to the drag-bar at the point c, (indicated by the dotted line.) By this means a transverse rocking movement is obtained to the bar when operated by the lever K, Figs. 3 and 4, connected therewith by a link, L, and rod M, Fig. 2. Said rod passes loosely through the tubular drag-bar. The rear end thereof is connected to the stay J. At the crown of the arch or bail is the stay, as shown in Fig. 1 at n.

It will be obvious that by this arrangement, on pushing the lever K, as indicated by the dotted line d, Fig. 1, a rocking movement will be given to the finger-bar, so that the points of the guards or fingers thereof may be turned more or less to the ground, and caused to run under lodged grass that may be lying close upon the ground.

The rear end of the drag-bar is secured from lateral movement by a brace, N, Fig. 5, one end of which is attached to the rear of the frame, whereas the lower end is attached to the shoe of the drag-bar by means of a staple, O.

The lower end of the drag-bar is raised from the ground by means of the lever P, Fig. 1, the short arm of the lever being attached to the bar by a chain, Q. Hence, on moving the lever toward the front of the machine, the short arm and chain will elevate the bar, and which may be held at any desired height by the pawl and ratchet-wheel R.

It will be obvious that on raising the drag-bar the heel of the finger-bar will be raised with it, while the outer end of said bar will remain upon the ground. By thus elevating only the heel of the bar an obstruction near the heel can be passed over, and thus avoid the lifting of the whole bar to the same height, but which, however, may be done by the lever S, Figs. 4 and 5, pivoted to the stay N at the point e.

It will be seen that the upper end of said lever is attached to a crank, T, by means of a chain, U. Now, on elevating the crank T, as indicated by the dotted line f, and which is done at the front of the machine by operating a corresponding crank, V, Fig. 3, the upper end of the lever S will be drawn up by the chain, which will bring the lever to the position indicated by the dotted line g, Fig. 4, thereby throwing the short arm of the lever down upon the edge of the shoe while it is on the ground, as shown in Fig. 5. Now, on raising the end of the drag-bar, the weight of the finger-bar will force the shoe against the end of the lever, thereby preventing the finger-bar from turning or the outer end from dropping down. Hence it will be rigidly held in an elevated horizontal position, and retained thus by the ratchet-wheel and pawl of the lever P, whereby the drag-bar is raised, as above said.

It will be observed that the drag-bar is connected to the arm H by a joint, the ball-section A', Figs. 1 and 2, of the joint being on the end of the arm, through which the tubular drag-bar passes and turns, the section B' being one, on each side of the ball and fixed to the drag-bar.

By constructing this particular joint in this manner is avoided all slack or end movement of the drag bar, and which also allows the bar to be turned or rotated for the purpose of elevating the cutter or finger-bar to a vertical position, as indicated by the dotted line h, Fig. 3, and which may be done by the lever C', on pushing it in the direction of the dotted line i.

From the above description it will be seen that the tubular drag-bar acts in two capacities—viz., that as a drag-bar and that as a pivotal support for the rod M—thus combining strength and a double use in the bar.

The shoe or stay J, above described, is, as aforesaid, pivoted to the drag-bar directly below and in line with the cutter-bar, and therefore in line with the joint D', connecting the pitman E' to the cutter-bar F'. By this means the pitman will at all times have the same horizontal relation to the cutter-bar, though the shoe may be rocked to its extreme degree, as the connection D' is in the axial line of the vibration of the shoe. Hence the connection is less liable to wear or become cramped by the vibration of the shoe, as it produces less change in the relation of the two parts of the joint than if the connection were made on one side of the axis of vibration.

It will also be seen that the rear brace-bar, N, is pivoted to the rear of the shoe W, the axial joint of which is in line with the joint n, whereby the rod M is connected to the shoe, and the direct line of the drag-bar, all being in one common line in direction of the drag-bar. Hence their several movements will be relatively harmonious, without twisting or cramping, thereby causing them to move with great freedom and ease.

The special purpose of raising and lowering the rear end of the frame B by means of the screw D, above described, is to elevate the finger-bar and shoe above the ground, which, should the ground be rough, will prevent the knives from turning into it, and thereby prevent injury to the machine.

E'' is a track-cleaner, which consists of a plate of metal, curved in the manner as shown in Figs. 1 and 2. The peculiar curve given to the cleaner causes it to throw the cut grass clear from the uncut, leaving a free and unobstructed path for the return of the chine.

*Claims.*

What I claim as my improvement, and desire to secure by Letters Patent, is—

1. The shoe J, when arranged in relation to the drag-bar G, and pivoted below the finger-bar and in line with the cutter-bar, in the manner described, and for the purpose set forth.

2. The arrangement of the rod M, tubular drag-bar G, link L, and lever K, substantially in the manner as described, and for the purpose specified.

VINCENT S. BARBER.

Witnesses:
W. H. BURRIDGE,
J. H. BURRIDGE.